(12) United States Patent
Romero et al.

(10) Patent No.: US 9,922,198 B2
(45) Date of Patent: Mar. 20, 2018

(54) METHODS, APPARATUS AND COMPUTER SYSTEMS THAT ENABLE HARDWARE MODULE USE RIGHTS OWNED BY ONE SERVER TO BE CLAIMED FOR USE BY ANOTHER SERVER IN A COMMON SHARE GROUP

(75) Inventors: Francisco J. Romero, Plano, TX (US); Erik Bostrom, Highlands Ranch, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 3698 days.

(21) Appl. No.: 11/518,084

(22) Filed: Sep. 7, 2006

(65) Prior Publication Data

US 2008/0065770 A1  Mar. 13, 2008

(51) Int. Cl.
*G06F 13/00* (2006.01)
*G06F 21/60* (2013.01)
*G06F 21/62* (2013.01)
*G06F 21/71* (2013.01)
*H04L 29/08* (2006.01)

(52) U.S. Cl.
CPC ............ *G06F 21/604* (2013.01); *G06F 21/62* (2013.01); *G06F 21/71* (2013.01); *H04L 67/1002* (2013.01); *G06F 2221/2141* (2013.01)

(58) Field of Classification Search
CPC ......... H04L 47/70; H04L 47/74; H04L 47/76; H04L 47/822; H04L 47/821; H04L 47/827; H04L 67/101; H04L 67/1002; G06F 9/5027; G06F 9/50; G06F 21/604; G06F 21/62; G06F 21/71; G06F 2221/2141

USPC .......................... 709/226, 223–225, 203, 229
See application file for complete search history.

(56) References Cited

U.S. PATENT DOCUMENTS

| 5,671,412 | A * | 9/1997 | Christiano | |
| 6,226,649 | B1 * | 5/2001 | Bodamer et al. ............. | 709/203 |
| 6,321,238 | B1 * | 11/2001 | Putzolu ............. | G06F 17/30575 |
| 6,633,538 | B1 * | 10/2003 | Tanaka et al. ................ | 370/222 |
| 6,711,571 | B2 * | 3/2004 | Putzolu ............. | G06F 17/30575 |
| 7,716,348 | B1 * | 5/2010 | Redding ................. | G06F 21/10 |
| | | | | 705/59 |
| 7,827,156 | B2 * | 11/2010 | Waxman et al. ............. | 707/694 |
| 7,877,473 | B2 * | 1/2011 | Tanaka .................... | G06F 21/10 |
| | | | | 709/224 |

(Continued)

OTHER PUBLICATIONS

Mike Guerette; "Agile licensing for an adaptive Enterprise" by HP published in Aug. 2005.*

(Continued)

*Primary Examiner* — Kenneth R Coulter
(74) *Attorney, Agent, or Firm* — Dahl & Osterloth, LLP (57) ABSTRACT

In one embodiment, a computer-implemented method groups two or more servers in a share group. The method then tracks how many rights to use a particular hardware module type are owned and in use by each of the servers. If a first one of the servers needs to activate an inactive one of the particular hardware module type, but does not own an unused right to use the particular hardware module type, the method then i) requests a second one of the servers to inactivate one of its hardware modules, thereby freeing a right to use the particular hardware module type, and ii) claims the freed right of the second server for use by the first server. Other embodiments are also disclosed.

31 Claims, 5 Drawing Sheets

(56) References Cited

U.S. PATENT DOCUMENTS

| | | | | |
|---|---|---|---|---|
| 2001/0039550 | A1* | 11/2001 | Putzolu | G06F 17/30575 |
| 2004/0054780 | A1* | 3/2004 | Romero | 709/226 |
| 2004/0168077 | A1* | 8/2004 | Waxman et al. | 713/200 |
| 2005/0132311 | A1* | 6/2005 | Foster et al. | 716/4 |
| 2005/0246441 | A1* | 11/2005 | Chandrasekaran et al. | 709/226 |
| 2006/0004909 | A1* | 1/2006 | Takuwa et al. | 709/203 |
| 2006/0161972 | A1* | 7/2006 | Cromer et al. | 726/5 |
| 2006/0224436 | A1* | 10/2006 | Matsumoto et al. | 705/10 |
| 2006/0236140 | A1* | 10/2006 | Tanaka | 713/300 |
| 2007/0043672 | A1* | 2/2007 | Martin et al. | 705/51 |
| 2007/0233872 | A1* | 10/2007 | Yoshikawa et al. | 709/226 |
| 2009/0013027 | A1* | 1/2009 | Tanaka | G06F 21/10 |
| | | | | 709/203 |
| 2013/0340051 | A1* | 12/2013 | Manoharan et al. | 726/4 |

OTHER PUBLICATIONS

Structured Computer Organization (Second Edition); Andrew S. Tanenbaum; 1984.*

* cited by examiner

METHODS, APPARATUS AND COMPUTER SYSTEMS THAT ENABLE HARDWARE MODULE USE RIGHTS OWNED BY ONE SERVER TO BE CLAIMED FOR USE BY ANOTHER SERVER IN A COMMON SHARE GROUP

BACKGROUND

Today's businesses are increasingly dependent on software applications. Often, a business wants to ensure that the fluctuating demands of some or all of their applications are met, or that some or all of their applications have high availability. This is especially so in the case of mission-critical applications. To accomplish this, a business may purchase backup (or failover) servers that can be employed to handle the tasks of a failed or otherwise offline server. A business may also purchase an extra server or servers, or one or more servers having the capacity to handle a greater workload than is currently or normally generated by the business. In this manner, a business may react to spikes in application demand (e.g., spikes in web traffic) or plan for business growth.

While various means exist for meeting the fluctuating demands of applications, and for ensuring their high availability, businesses often face the reality of limited information technology (IT) budgets. One means to help reduce the initial investment that a business must expend to meet the fluctuating demands of their applications, or to ensure the high availability of their applications, is "instant capacity" or "capacity on demand".

Instant capacity models can take various forms, but in one exemplary form enable a user to 1) purchase hardware modules in accord with a first fee structure, and then 2) purchase rights to use the hardware modules in accord with a second fee structure. By separating the rights to have and to use a hardware module, a business can acquire the right to "have" a hardware module at an early date, and at a reduced cost. The business can then acquire a right to use the hardware module at a later date, and for an additional cost. In this manner, the hardware module can be physically readied for deployment prior to when it is needed; and when the business then needs the hardware module, the business does not have to wait for the hardware module to be shipped and/or installed. That is, the business need only acquire a right to use the module (which can often be acquired via a webpage, in the form of a right code). Of note, rights to use a hardware module may take various form, including those of permanent use rights and temporary use rights.

BRIEF DESCRIPTION OF THE DRAWINGS

Illustrative embodiments of the invention are illustrated in the drawings, in which.

DETAILED DESCRIPTION

In the past, instant capacity has been associated with a particular server. For example, a business (or any server user) might have ordered a server in which hardware modules such as a plurality of processors, a plurality of memory modules, and/or a number of optionally enabled compute resource boards were installed. The business would then have acquired rights to use all, some, or even none of the server's modules. However, as the business acquired the rights to use the server's various modules, the rights were permanently tied to the server.

While the above instant capacity "use model" was effective in providing a business with instant capacity at a reduced up-front cost, occasions could arise when the business 1) installed a particular application or applications on a server, 2) purchased the rights to use additional hardware modules of the server, expecting that demand for the application(s) installed on the server would increase, but then 3) discovered that their expectations were wrong, and that additional hardware modules enabled by additional use rights were not being used (or at least not being used to their fullest extent). Although it might have been possible to re-commission the server for a different use, and thereby more fully use the server's capacity, such a re-commissioning might have resulted in significant downtime and expense.

The above "use model" could also present problems when a server failed, and the use rights associated with its hardware modules were then unusable, or perhaps only transferable to another server after 1) an IT manager and/or an equipment vendor was contacted, and 2) a business was forced to weigh the pros and cons of A) suffering slow application response time while the rights were transferred, and B) purchasing additional use rights for another server.

Figure 1:
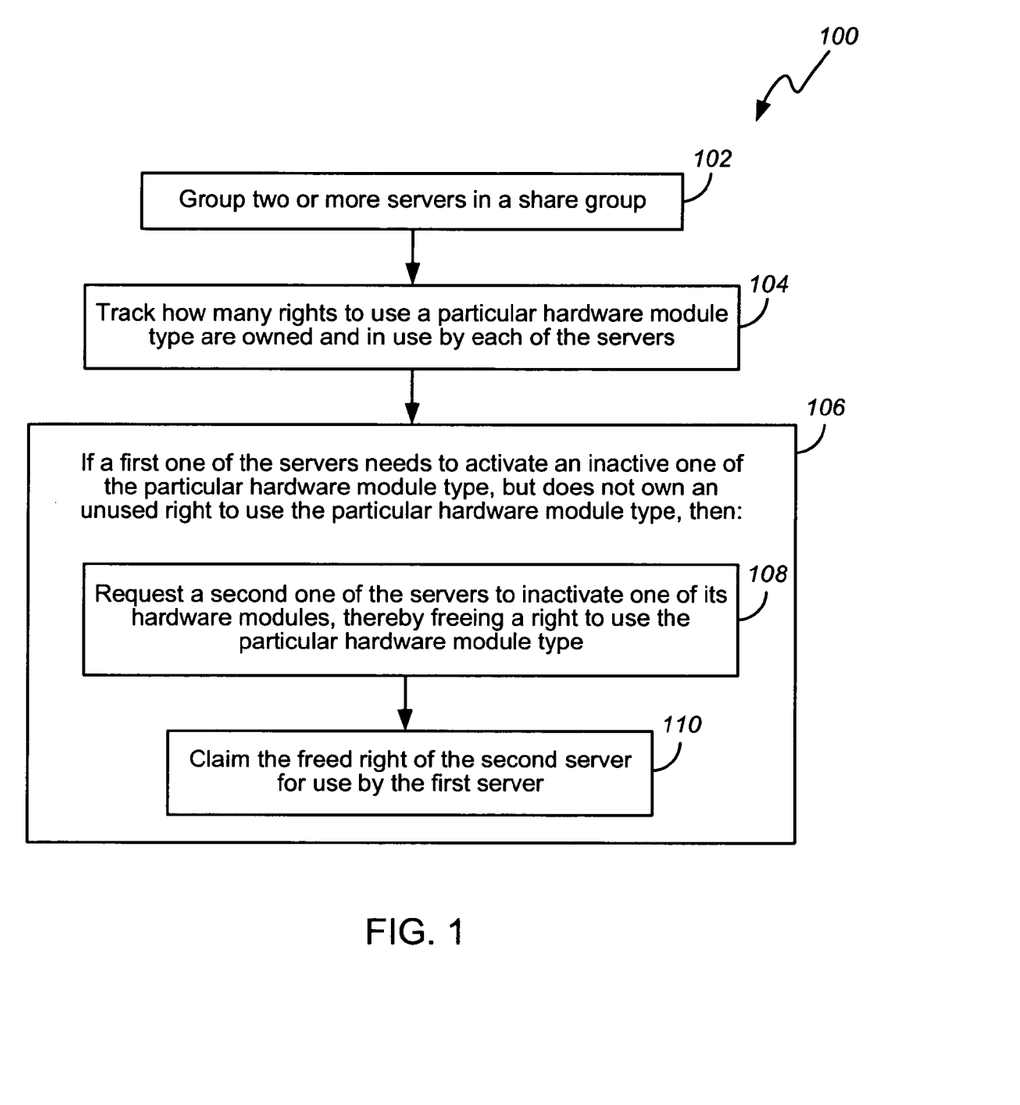
FIG. 1 illustrates an exemplary method that enables hardware module use rights owned by one server to be claimed for use by another server in a common share group.

In the context of the above-described single-server instant capacity use model, FIG. 1 presents an exemplary new computer-implemented method 100 that enables hardware module use rights owned by a one server to be claimed for use by another server in a common share group. In accord with the method 100, two or more servers may be grouped in a share group (block 102). A share group manager or other computer process may then track how many rights to use a particular hardware module type are owned and in use by each of the servers (block 104). Thereafter, if a first one of the servers needs to activate an inactive one of the particular hardware module type, but does not own an unused right to use the particular hardware module type, then the method 100 i) requests a second one of the servers to inactivate one of its hardware modules, thereby freeing a right to use the particular hardware module type, and ii) claims the freed right of the second server for use by the first server. See, blocks 106, 108 and 110 of FIG. 1.

After claiming a right for use by another server, the method 100 may enable the server for which the right was claimed to activate an inactive and appropriate one of its hardware modules, thereby maximizing the return on investment (ROI) of a business' hardware module use rights.

Various factors may precipitate a server's need to activate an inactive one of its hardware modules, and may thereby trigger the claiming of a right owned by one server for use by another server. Precipitating factors might include 1) a previously active hardware module having failed or otherwise been taken offline, or 2) a load on a particular server temporarily requiring additional capacity for its effective handling (and the server having inactive hardware modules). Also, it is noted that a server's "need" to activate an inactive hardware module may be identified by the server itself, or by a process external to the server, such as a system administrator, a software proxy, a load balancer, or a share group manager.

The method 100 can be employed to track (and claim for use by another server) rights for various different "types" of hardware modules, including processors, processor cores, compute resource boards, memory modules, or input/output (I/O) subsystems.

Within a particular hardware module type, the rights that are tracked may in some cases be limited to rights for identical hardware modules. In other cases, the rights that are tracked for a particular hardware module type may include, for example, rights for different models, brands or releases of a hardware module. As will be described in more detail later in this description, rules may be defined to specify what hardware modules and rights are considered equivalent for the purpose of tracking and claiming rights. Or, a credit value may be assigned to rights having different values, and when a server needs to activate an inactive hardware module, one or more unused rights having a total credit value that covers a credit value needed to activate the inactive hardware module may be claimed.

Not only may the method 100 be employed to track rights for various different types of hardware modules, but they may be employed to do so at the same time. For example, rights for processor cores could be tracked within a share group, while at the same time, rights for memory modules could be tracked within the share group.

In addition to the rights that are tracked by the method 100 corresponding to different types of hardware modules, the rights themselves may take different forms. For example, the rights may include one or both of: perpetual rights; and temporary rights having one or more expiration terms. With respect to a temporary right, its expiration term may be variously defined, and may include an expiration term based on 1) use for a defined number of time units, 2) use until a defined time or date, or 3) use for a defined number of work units.

In some embodiments of the method 100, different use right types (e.g., perpetual and temporary) may be tracked and pooled separately. In other embodiments of the method 100, a share group manager may prioritize or otherwise negotiate the use of particular use right types. For example, if a server needs to activate an inactivate one of its hardware modules, the share group manager might first attempt to claim a temporary right that is not in use, before attempting to claim a temporary or permanent right that is already in use. In this manner, disruption of useful work might be avoided. Alternately (or additionally), other rules for negotiating right use may be invoked. For example, if a temporary right has an expiration term based on a defined time or date, this temporary right might be claimed for use by another server before another temporary right with less strenuous restrictions is claimed.

The method 100 can be implemented by a computer, in response to the execution of computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

Figure 2:
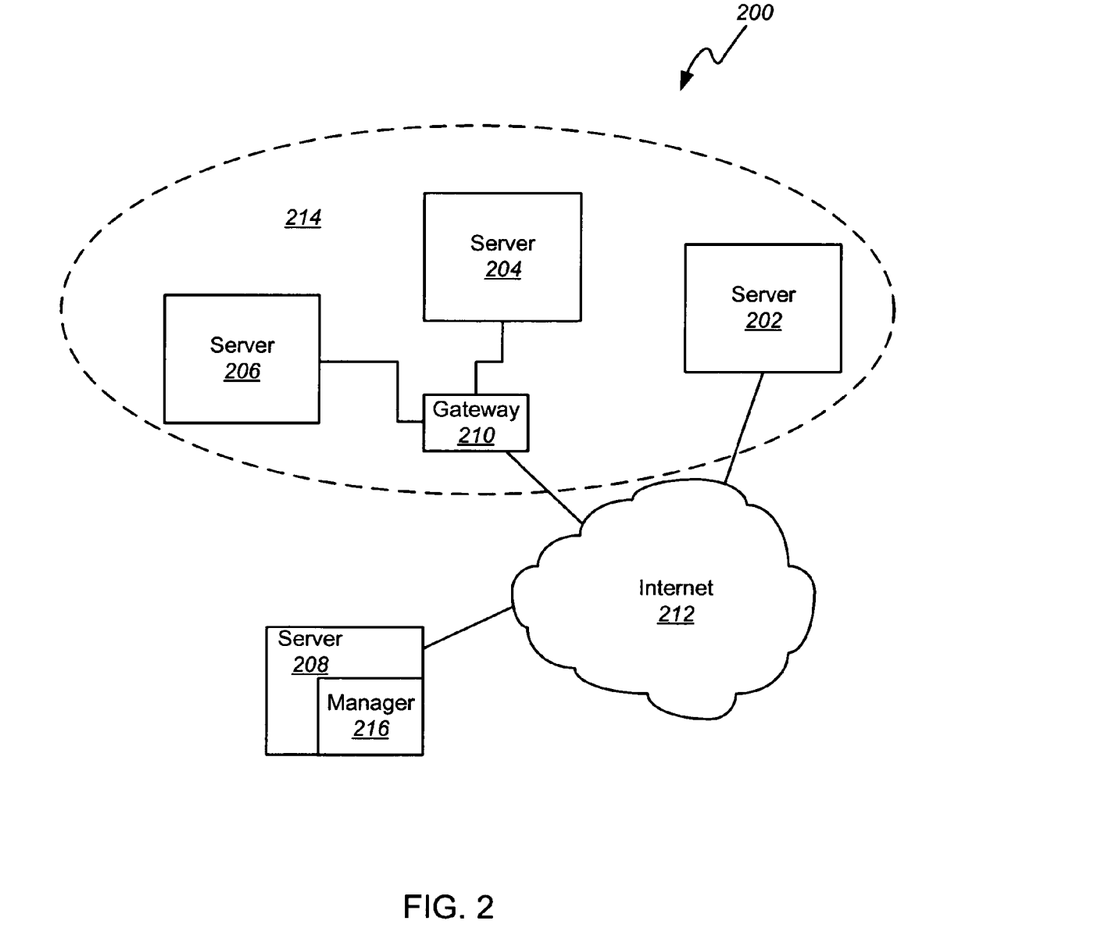
FIG. 2 illustrates an exemplary computer system in which the method shown in FIG. 1 may be implemented.

FIG. 2 illustrates an exemplary computer system 200 in which the method 100 may be implemented. The system 200 comprises a plurality of networked servers 202, 204, 206, 208 that are under control of a particular business or entity. The servers 202, 204, 206, 208 may be physically located at the same or different locations, and may be coupled to each other in a peer arrangement, via a gateway 210, via the internet 212, or via other means. Two or more of the servers, such as servers 202, 204 and 206 may belong to a share group 214.

A share group manager 216 may be installed on any of the servers 202, 204, 206, 208 and may be configured to track i) which of the plurality of servers 202, 204, 206, 208 belong to which of a number of share groups (such as share group 214), and ii) how many rights to use a particular hardware module type are owned and in use by each of the servers 202, 204, 206 in each share group 214. The share group manager 216 may be further configured to respond to servers 202, 204, 206 in a share group 214 that need to activate inactive ones of their hardware modules. As a result, the share group manager 216 may be configured to execute the method 100 (FIG. 1).

Preferably, the share group manager 216 is hosted by a server 208 that is not part of any of the share groups 214 that it manages. In this manner, the share group manager's availability can be maintained independently of the availability of the servers 202, 204, 206 in its managed share groups (e.g., share group 214).

In some cases, and as previously alluded to, a share group manager 216 may manage multiple share groups, as well as rights for multiple hardware module types found within ones of the share groups.

Figure 3A:
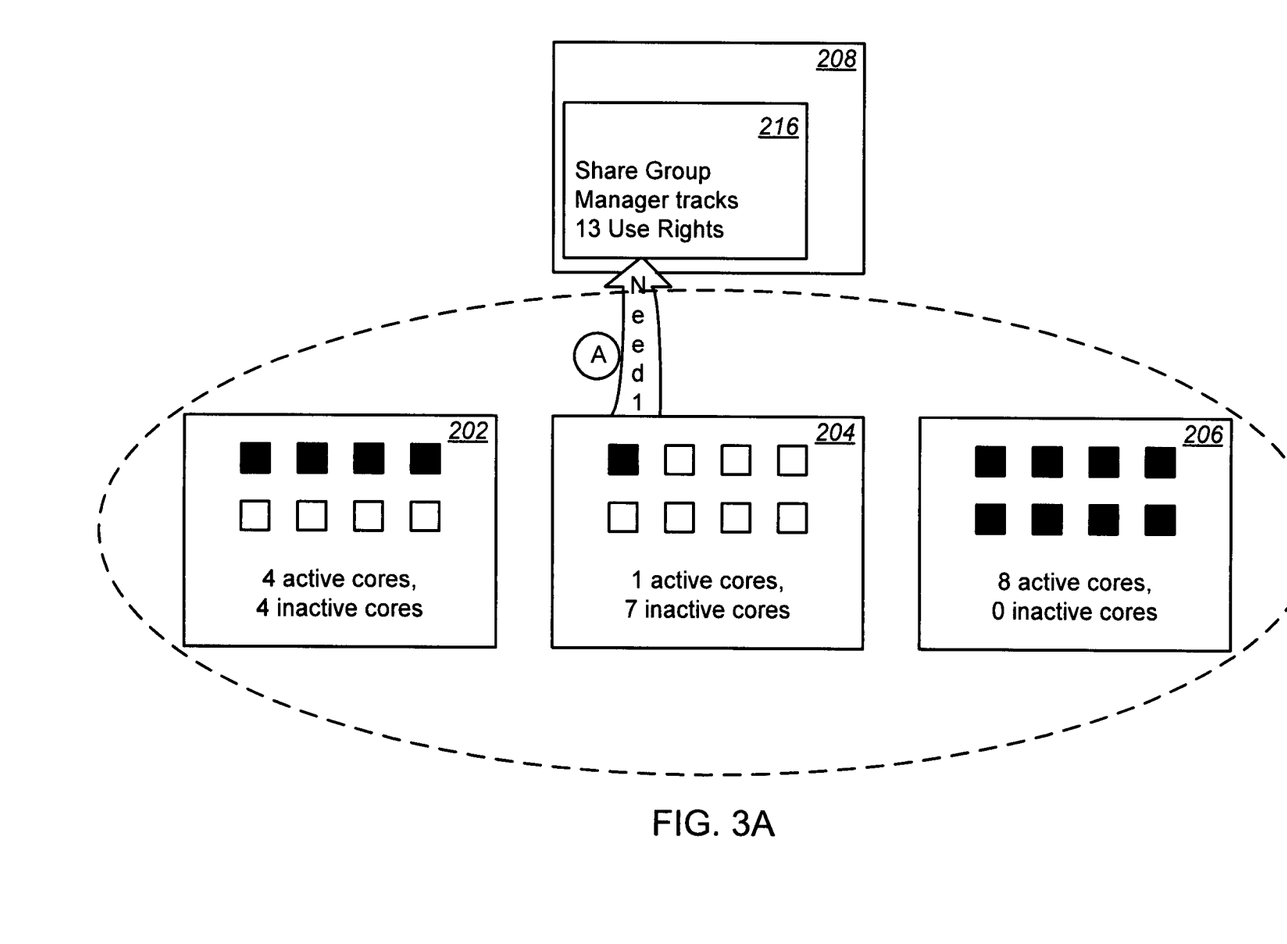
FIGS. 3A & 3B illustrate an exemplary application of the method shown in FIG. 1, in the context of one exemplary configuration of the computer system shown in FIG. 2.
Figure 3B:
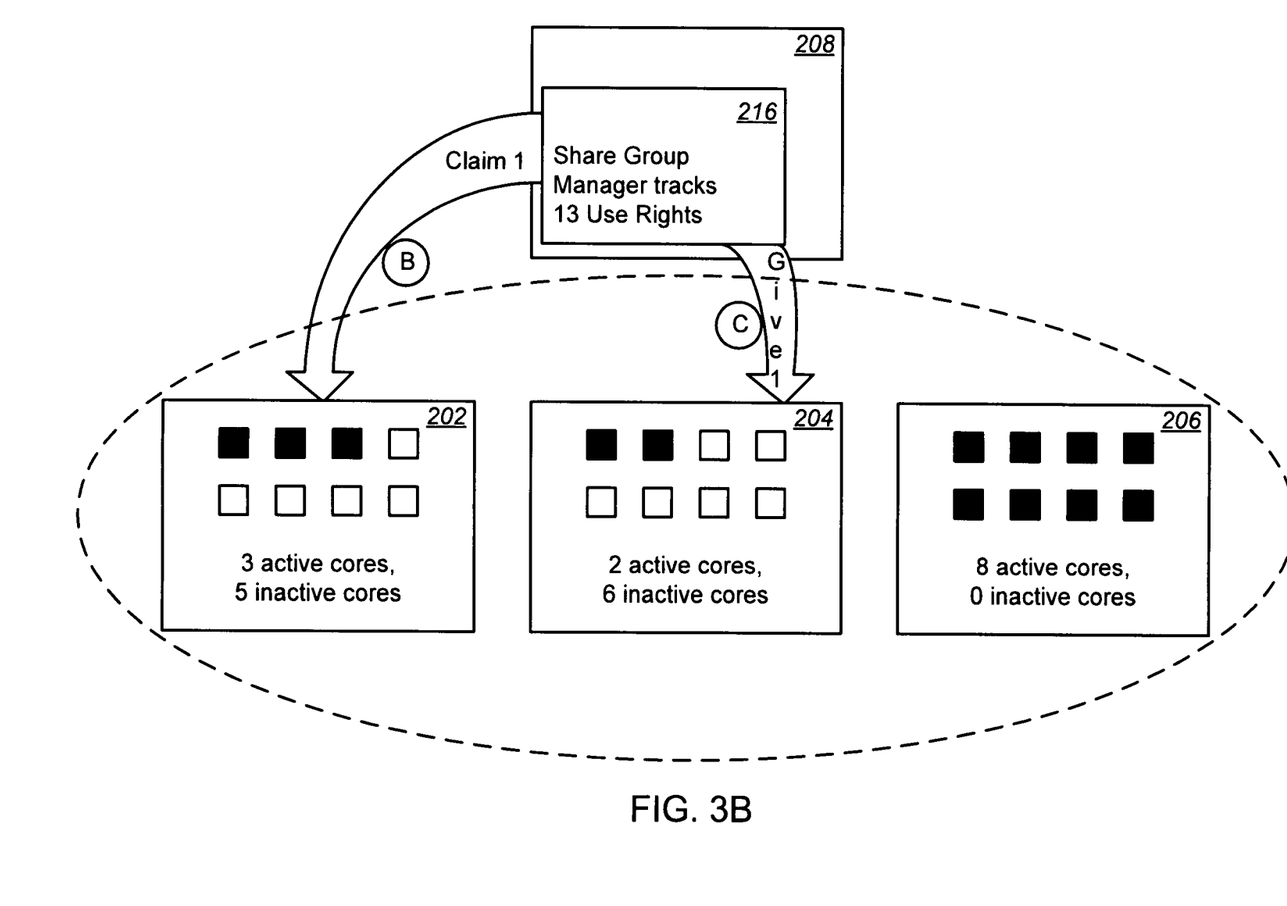

FIGS. 3A & 3B illustrate one exemplary application of the method 100 (FIG. 1), in the context of one exemplary configuration of the computer system 200 (FIG. 2).

As shown in FIG. 3A, each of the servers 202, 204, 206 in the share group 214 has eight processor cores (denoted by small boxes within the servers 202, 204, 206). Server 202 has four active cores (denoted by shaded ones of the small boxes) and four inactive or "instant capacity" cores (denoted by empty ones of the small boxes). Similarly, server 204 has one active core and seven inactive cores; and server 206 has eight active cores and no inactive cores. After the servers 202, 204, 206 have been grouped within the share group 214, the share group manager 216 may determine the total number of processor core use rights that exist within the share group 214, as well as their locations. Then, upon one of the servers, such as server 204, having a need to activate an additional processor core (represented by arrow "A"), the share group manager 216 may 1) request that one of the servers, such as server 202, inactivate one of its processor cores, thereby causing a right to use a processor core to be freed for use by another server (arrow "B" in FIG. 3B), and then 2) claim the freed use right and provide it, or otherwise reserve it, to/for the server 204 (arrow "C").

Figure 4:
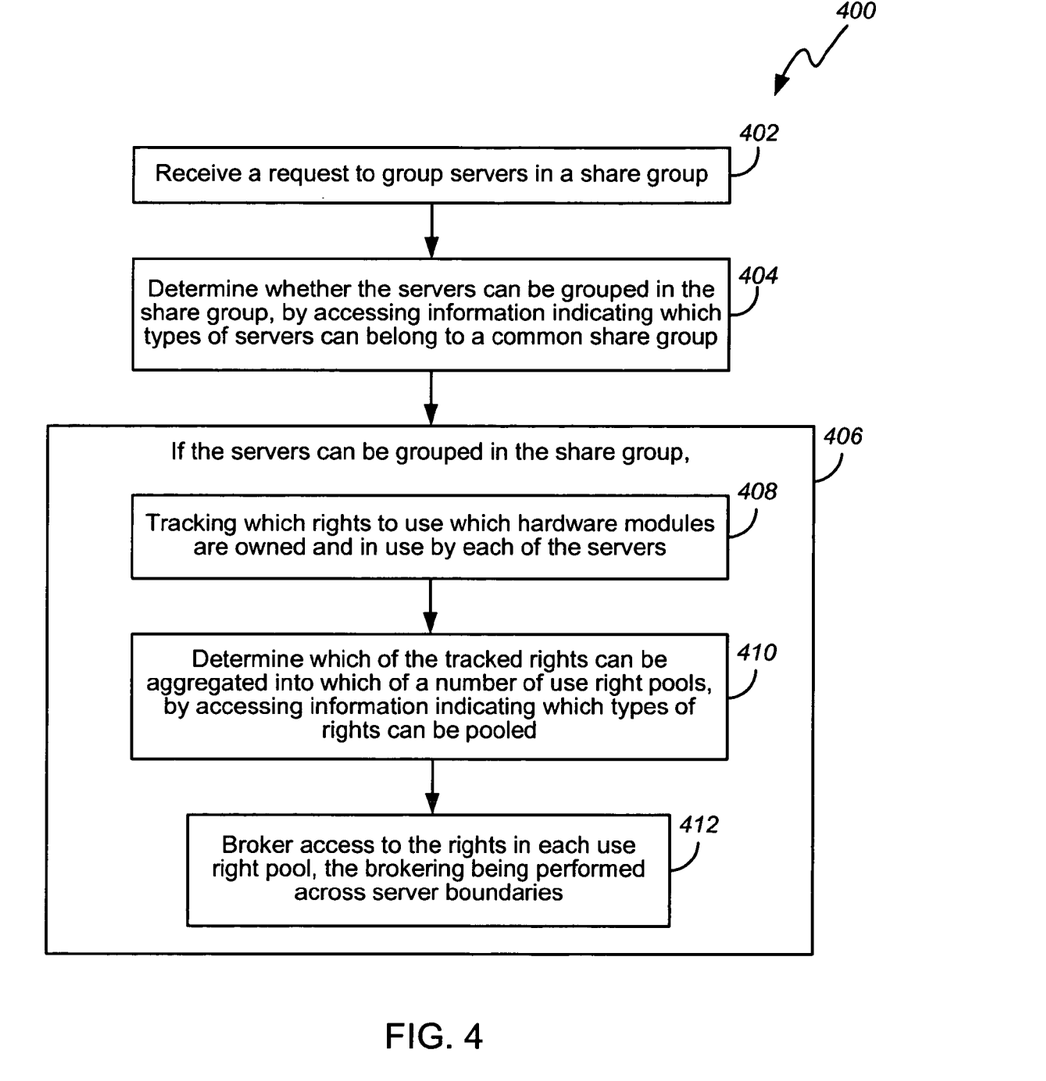
FIG. 4 illustrates an exemplary method for allowing an equipment vendor or IT manager to control 1) which servers can be grouped within a common share group, and 2) which rights can be pooled and claimed for use by another server.

In many cases, an equipment vendor or IT manager will want to control 1) which servers can be grouped within a common share group, and 2) which rights can be pooled and claimed for use by another server. FIG. 4 therefore illustrates an exemplary computer-implemented method 400 for doing this.

In accord with the method 400, a share group manager receives a request to group servers in a share group (block 402) and then determines whether the servers can be grouped in the share group by accessing information indicating which types of servers can belong to a common share group (block 404). If it is determined that the servers can be grouped in the share group (block 406), then the share group manager 1) tracks which rights to use which hard modules are owned and in use by each of the servers (block 408); 2) determines which of the tracked rights can be aggregated into which of a number of use right pools, by accessing information indicating which types of rights can be pooled (block 410); and 3) brokers access to the rights in each use right pool (block 412). In contrast to past "instant capacity" use models, the brokering is performed across server boundaries.

In one embodiment of the method 400, the information that indicates which types of servers can belong to a common share group is retrieved from a file that contains information such as relationships between compatible or equivalent server models. The information may also indicate which "configured" server models are compatible or equivalent. For example, two otherwise compatible servers might not be considered compatible if they (or their partitions) run different operating systems.

In one embodiment of the method 400, the information that indicates which types of rights can be pooled is also retrieved from a file, and possibly from the same file that contains the information that indicates which types of servers can belong to a common share group. By way of example, the information that indicates which types of rights can be pooled may indicate which hardware modules, including models, brands or releases of a hardware module, are compatible for the purpose of pooling their rights.

In one embodiment of the method 400, the information discussed in the preceding two paragraphs is downloaded from a web portal. The downloading is preferably automatic, such that an IT manager need not be involved, and a share group manager can download the information without human involvement. An automatic download not only removes the burden of downloading information from an IT manager, but it can also be used to download the information in a secure way, such that vendor-controlled information cannot be easily modified by a software hacker or system attacker. In some cases, however, an interface may be provided for the purpose of allowing an equipment vendor or other approved party to customize the information.

In addition to determining whether certain types of servers can belong to a common share group, the method 400 may determine whether a required number of licenses to form a share group exist. If the licenses do not exist, the method 400 can prohibit formation of the share group. For example, under some licensing schemes, a license authorizing each of a number of servers to be grouped in a share group may be needed. Similarly, licenses authorizing each of a number of hardware modules to share its use rights with other servers may be needed.

As previously mentioned, when rights are pooled, a credit value may be assigned to rights having different values. As part of brokering access to the unused ones of rights in a right pool, the method 400 may be required to identify and claim one or more use rights having a total credit value that covers a credit value of a use right that is needed by a particular one of the servers in the share group.

In some embodiments of the method 400, brokering access to use rights in one or more of the use right pools may comprise, for a right that is in use, i) deactivating a hardware module on a first one of the servers, and then ii) activating a hardware module of a same type on a second one of the servers. In the same or different embodiments of the method 400, brokering access to the rights in one or more of the use right pools may comprise claiming an unused temporary right owned by a first one of the servers, for use by a second one of the servers.

What is claimed is:

1. A computer-implemented method, comprising:
    grouping, with a processor, at least a first server and a second server in a share group, wherein the first server includes hardware modules, and the second server includes hardware modules;
    tracking, with the processor, how many rights to use a particular hardware module type are owned and in use by each of the servers; and
    if the first server needs to activate an inactive hardware module of the particular hardware module type included in the first server, but has an inadequate number of use rights in the first server because the first server does not own an unused right to use the particular hardware module type, then:
        requesting, with the processor, the second server to inactivate one of its hardware modules of the particular hardware module type using a right, thereby freeing the right to use the particular hardware module type, and
        claiming, with the processor, a freed right of the second server for use by the first server.

2. The method of claim 1, wherein the particular hardware module type includes different models of a hardware module.

3. The method of claim 1, wherein the particular hardware module type includes different brands of a hardware module.

4. The method of claim 1, wherein the particular hardware module type includes different releases of a hardware module.

5. The method of claim 1, wherein the particular hardware module type is a type of processor.

6. The method of claim 1, wherein the particular hardware module type is a type of processor core.

7. The method of claim 1, wherein the particular hardware module type is a type of compute resource board.

8. The method of claim 1, wherein the particular hardware module type is a type of memory module.

9. The method of claim 1, wherein the particular hardware module type is a type of input/output (I/O) subsystem.

10. The method of claim 1, further comprising, performing, with the processor, said right tracking, requesting and claiming actions for each of a plurality of hardware module types.

11. The method of claim 1, further comprising, determining, with the processor, that the first server needs to activate the inactive hardware module of the particular hardware module type included in the first server when an active hardware module of the particular hardware module type included in the first server has failed.

12. The method of claim 1, further comprising, determining, with the processor, that the first server needs to activate the inactive hardware module of the particular hardware module type included in the first server when a load on the first server exceeds a threshold.

13. The method of claim 1, wherein tracked rights include perpetual rights.

14. The method of claim 1, wherein tracked rights include temporary rights having one or more expiration terms.

15. The method of claim 1, wherein:
tracked rights include i) perpetual rights, and ii) temporary rights having one or more expiration terms; and
if the first server needs to activate the inactive hardware module of the particular hardware module type included in the first server, then attempting, with the processor, to claim one of the temporary rights, before attempting to claim a temporary or permanent right that is already in use.

16. Apparatus, comprising:
non-transitory computer-readable media; and
computer-readable program code, stored on the non-transitory computer-readable media, including,
   code to group at least a first server and a second server in a share group, wherein the first server includes hardware modules, and the second server includes hardware modules;
   code to track how many rights to use a particular hardware module type are owned and in use by each of the servers; and
   code to, if the first server needs to activate an inactive hardware module of the particular hardware module type included in the first server, but has an inadequate number of use rights in the first server because the first server does not own an unused right to use the particular hardware module type, then:
      request the second one of said servers to inactivate one of its hardware modules of the particular hardware module type using a right, thereby freeing the right to use the particular hardware module type,
      claim a freed right of the second server for use by the first server, and
      enable the first server to activate the inactive hardware module of the particular hardware module type included in the first server.

17. A computer system, comprising:
a plurality of networked servers, grouping at least a first server and a second server in a share group, wherein the first server includes hardware modules, and the second server includes hardware modules; and
a share group manager, installed on one of the servers and configured to,
   track which of the plurality of networked servers belong to which of a number of share groups, and how many rights to use a particular hardware module type are owned and in use by each of the servers; and
   if the first server in said share group needs to activate an inactive hardware module of the particular hardware module type included in the first server, but has an inadequate number of use rights in the first server because the first server does not own an unused right to use the particular hardware module type, then:
      request the second server to inactivate one of its hardware modules of the particular hardware module type using a right, thereby freeing the right to use the particular hardware module type,
      claim a freed right of the second server for use by the first server, and
      enable the first server to activate the inactive hardware module of the particular hardware module type included in the first server.

18. The computer system of claim 17, wherein the share group manager is hosted by a server that is not part of the share group.

19. The computer system of claim 18, wherein a share group manager tracks and manages rights for multiple hardware module types found within the share group.

20. The computer system of claim 17, wherein the share group manager manages multiple share groups formed amongst the plurality of networked servers.

21. A computer-implemented method, comprising:
receiving, with a processor, a request to group servers in a share group, wherein each of the servers includes hardware modules;
determining, with a processor, whether the servers can be grouped in the share group by accessing information indicating which types of servers can belong to a common share group; and
if the servers can be grouped in the share group,
   for each of the servers, tracking, with the processor, which rights to use the hardware modules included in that server are owned and in use by that server;
   determining, with the processor, which tracked rights can be aggregated into which of a number of use right pools, by accessing information indicating which types of rights can be pooled; and
   brokering, with the processor, access to the rights in each use right pool, the brokering being performed across server boundaries, wherein the brokering is in response to an inadequate number of use rights at a first one of the servers.

22. The method of claim 21, wherein brokering access to the rights in at least one use right pool comprises, for a right that is in use, i) deactivating, with a processor, a hardware module on a first one of the servers, and then ii) activating a hardware module of a same type on a second one of the servers.

23. The method of claim 21, wherein brokering access to the rights in at least one use right pool comprises, claiming, with the processor, an unused temporary right owned by a first one of the servers, for use by a second one of the servers.

24. The method of claim 21, further comprising, downloading, with the processor, the information indicating i) which types of servers can belong to a common share group, and ii) which types of rights can be pooled, from a web portal.

25. The method of claim 21, further comprising, providing an interface, with the processor, through which an equipment vendor can customize the information indicating i) which types of servers can belong to a common share group, and ii) which types of rights can be pooled.

26. The method of claim 21, further comprising, determining, with the processor, whether a required number of licenses to form the share group exist, and if not, prohibiting formation of the share group.

27. The method of claim 21, wherein, if the servers can be grouped in the share group:
each tracked right is assigned a credit value by the processor; and
as part of brokering access to unused ones of the rights in each use right pool, the method identifies and claims, with the processor, one or more rights having a total credit value that covers a credit value of a right needed by a particular one of the servers in the share group.

28. Apparatus, comprising:
non-transitory computer-readable media; and
computer-readable program code, stored on the non-transitory computer-readable media, including, code to receive a request to group servers in a share group, wherein each of the servers includes hardware modules;

code to determine whether the servers can be grouped in the share group by accessing information indicating which types of servers can belong to a common share group; and code to, if the servers can be grouped in the share group,
for each of the servers, track which rights to use the hardware modules included in that server are owned and in use by that server;
determine which tracked rights can be aggregated into which of a number of use right pools, by accessing information indicating which types of rights can be pooled; and
broker access to the rights in each use right pool, the brokering being performed across server boundaries, wherein the brokering is in response to an inadequate number of use rights at a first one of the servers.

29. A computer system, comprising:
a plurality of networked servers, each including hardware modules; and
a share group manager, installed on one of the servers and configured to,
receive a request to group the networked servers in a share group;
determine whether the networked servers can be grouped in the share group by accessing information indicating which types of servers can belong to a common share group; and
if the networked servers can be grouped in the share group,
for each of the networked servers, track which rights to use the hardware modules included in that networked server are owned and in use by that networked server;
determine which tracked rights can be aggregated into which of a number of use right pools, by accessing information indicating which types of rights can be pooled; and
broker access to the rights in each use right pool, the brokering being performed across server boundaries, wherein the brokering is in response to an inadequate number of use rights at a first one of the servers.

30. The system of claim 29, further comprising a web portal from which the share group manager downloads the information indicating i) which types of servers can belong to a common share group, and ii) which types of rights can be pooled.

31. The system of claim 29, further comprising an interface, provided by the share group manager, through which an equipment vendor can customize the information indicating i) which types of servers can belong to a common share group, and ii) which types of rights can be pooled.

* * * * *